(12) United States Patent
Gohl et al.

(10) Patent No.: US 10,058,800 B2
(45) Date of Patent: Aug. 28, 2018

(54) FILTER DEVICE

(71) Applicant: MANN+HUMMEL GMBH, Ludwigsburg (DE)

(72) Inventors: Pamela Gohl, Remseck (DE); Marco Faisst, Besigheim (DE); Guenter Jokschas, Murrhardt (DE); Pius Trautmann, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 649 days.

(21) Appl. No.: 14/795,495

(22) Filed: Jul. 9, 2015

(65) Prior Publication Data
US 2015/0343340 A1 Dec. 3, 2015

Related U.S. Application Data

(63) Continuation of application No. PCT/EP2013/075898, filed on Dec. 9, 2013.

(30) Foreign Application Priority Data

Jan. 11, 2013 (DE) .................. 10 2013 000 337

(51) Int. Cl.
*B01D 29/13* (2006.01)
*B01D 29/21* (2006.01)
*B01D 37/02* (2006.01)

(52) U.S. Cl.
CPC .............. *B01D 29/13* (2013.01); *B01D 29/21* (2013.01); *B01D 37/025* (2013.01); *B01D 2201/0415* (2013.01); *B01D 2201/291* (2013.01); *B01D 2201/4084* (2013.01); *B01D 2239/04* (2013.01)

(58) Field of Classification Search
CPC ...... B01D 29/13; B01D 29/21; B01D 37/025; B01D 2201/0415; B01D 2201/291; B01D 2201/4084; B01D 2239/04
See application file for complete search history.

(56) References Cited

U.S. PATENT DOCUMENTS

| 3,749,247 | A  | * | 7/1973  | Rohde ................. B01D 37/025 210/205 |
| 7,238,285 | B2 |   | 7/2007  | Hacker et al. |
| 2002/0038780 | A1 | * | 4/2002  | Jokschas ................ B01D 27/06 210/86 |
| 2005/0173325 | A1 | * | 8/2005  | Klein ..................... B01D 27/06 210/206 |
| 2008/0302717 | A1 |   | 12/2008 | Terry et al. |

* cited by examiner

*Primary Examiner* — James Goloboy
(74) *Attorney, Agent, or Firm* — James Hasselbeck

(57) ABSTRACT

A filter device is provided with an annular filter element. A central tube is inserted into the annular filter element so as to delimit an inwardly positioned cavity of the annular filter element. A functional part is inserted into the annular filter element and extends parallel to a longitudinal axis of the annular filter element, wherein the functional part is arranged in radial direction of the annular filter element outward of the central tube. The functional part has a radial inwardly positioned wall facing the central tube. The central tube has a facing wall that is facing the radial inwardly positioned wall of the functional part. The radial inwardly positioned wall of the functional part is positioned parallel to or concentric to the facing wall of the central tube.

11 Claims, 3 Drawing Sheets

FILTER DEVICE

CROSS-REFERENCE TO RELATED APPLICATIONS

This application is a continuation application of international application No. PCT/EP2013/075898 having an international filing date of 9 Dec. 2013 and designating the United States, the International Application claiming a priority date of 11 Jan. 2013, based on prior filed German patent application No. 10 2013 000 337.7, the entire contents of the aforesaid international application and the aforesaid German patent application being incorporated herein by reference

BACKGROUND OF THE INVENTION

The invention concerns a filter device, in particular liquid filter, comprising an annular filter element and a functional part insertable into the filter element and extending parallel to the longitudinal axis of the filter element.

U.S. Pat. No. 3,749,247 discloses a filter device for oil filtration that comprises a folded annularly configured filter element which is flowed through by the oil to be purified in radial direction. In order to reduce the risk of oxidation of the oil, the filter device is provided with two cylindrical additive containers in which an additive inhibiting oxidation is contained that mixes with the oil upon flow through the filter device. The additive containers are arranged diametrically opposed parallel to the longitudinal axis of the filter element and integrated into the paper folds of the filter element. In case of radial inflow at the filter element from the exterior to the interior, the additive containers constitute an obstacle for the oil that accordingly must find a path through neighboring sections of the filter element.

SUMMARY OF THE INVENTION

The invention has the object to configure a filter device having a functional part integrated in its filter element with simple constructive measures such that it has a high degree of efficiency.

This object is solved according to the invention in that into the filter element a central tube is inserted that delimits an inwardly positioned cavity and in that the functional part is arranged radially outside of the central tube, wherein the radial inwardly positioned wall of the functional part that is facing the central tube is positioned parallel or concentric to the facing wall of the central tube. The dependent claims provide expedient further developments.

The filter device according to the invention is preferably used for filtration of liquids, for example, for filtration of fuel or oil, in particular in motor vehicles. In principle, a filtration of gaseous media is however also conceivable, for example, use as an air filter.

The filter device comprises an annular filter element into which is integrated a support tube or central tube which imparts additional stability to the annular filter element. The central tube delimits an inwardly positioned cavity in which the fluid flows in axial direction. As the fluid flows into the annular filter element in radial direction from the exterior to the interior, the inwardly positioned cavity constitutes the clean side via which the purified fluid is discharged axially.

The central tube is preferably embodied cylindrical or approximately cylindrical. The inwardly positioned cavity has in this case also a cylinder shape or approximately a cylinder shape.

The filter device is provided with a functional part that is arranged in the annular filter element. The annular filter element is advantageously designed as a folded filter element wherein the functional part, in circumferential direction, is delimited by the filter element, in particular by the folds of the filter element. The functional part is in particular an elongate component whose longitudinal axis is extending parallel to the longitudinal axis of the filter element but at a radial spacing relative to the longitudinal axis of the filter element. The functional part extends advantageously across the entire axial length of the filter element.

The functional part can basically take on different functions or tasks. According to an advantageous embodiment, it is provided that the functional part comprises a cartridge for receiving a functional medium, for example, an additive, which is admixed to the fluid to be filtered upon filtration in order to have an effect on the properties of the fluid. For example, the functional medium can be embodied as an additive which, for regeneration of the fluid, is admixed to the fluid. In case of an oil filter, the additive serves for regenerating the oil so that the service intervals can be extended.

In the filter device according to the invention, the functional part is complementary to a recess in the filter element and therefore fits in circumferential direction form-fittingly in the recess in the filter element. The functional part is positioned radially outside of the central tube in the filter element, wherein the radial inwardly positioned wall of the functional part which is facing the central tube is positioned parallel to or concentric to the facing wall of the central tube.

In the filter device which is formed in this way, the available space for receiving the filter element including the functional part is optimally utilized. Also, in the filter element, despite accommodation of the functional part, a maximally possible filter surface for the filtration of the fluid can be utilized. Hollow spaces between the functional part and the filter element that cannot be used can be avoided; as a whole, the degree of efficiency with regard to the filtration is improved.

According to an advantageous embodiment, the functional part in cross-section is designed as a circular segment or circular sector, wherein the radial outwardly positioned wall of the functional part at least approximately has the same (identical) outer radius as the annular filter element. In this way, it is ensured that the outer side of the functional part is integrated into the wall surface of the filter element and is embodied as a complementarily designed segment which supplements the recess in the filter element. The segment shape of the functional part which extends in radial direction up to the central tube enables an optimal mounting space utilization and thus, relative to the cross-section, a relatively large receiving volume in the functional part. This makes it possible to keep the angular segment across which the functional part extends relatively small so that a corresponding enlarged surface area in the filter element is available for filtration.

According to a further expedient embodiment, the wall of the central tube is flat on the side which is facing the functional part. Accordingly, the neighboring wall of the complementary functional part that is facing the central tube is also flat. The central tube is therefore not completely cylindrical but has a segment missing from the cylinder. In principle, curved walls are also possible, in particular circular walls, wherein the wall of the central tube and the neighboring wall of the functional part are arranged concentric to each other.

The neighboring walls of central tube and functional part can have a minimal spacing relative to each other. This makes it possible, according to a further advantageous embodiment, that a section of the filter element extends in the gap between central tube and functional part and that in particular the filter material of the filter element can be embodied accordingly to be continuous in circumferential direction.

According to a further advantageous embodiment, the wall of the central tube on the side which is facing the functional part is of a closed configuration. The remaining wall sections of the central tube, in contrast thereto, are provided with a plurality of flow openings in order to enable flow through the filter element in radial direction. The closed wall of the central tube in the angular section which is facing the functional part enables a more uniform flow through the filter element. The closed wall can also optionally be flat so that, in cross-section, a segment is missing in the essentially cylindrical central tube. However, it is also possible, as described above, that the wall of the central tube which is facing the functional part is curved or of a part-circular configuration and, at the same time, is embodied as a closed wall surface in the angular segment that is neighboring the functional part.

According to a further expedient embodiment, the annular filter element is received between end-face terminal discs. The terminal discs can be connected fixedly with the filter element. The functional part is expediently delimited at least at one end face by one of the terminal discs. According to a further embodiment variant, the oppositely positioned terminal disc has a cutout for the functional part so that the functional part optionally can be inserted through this cutout in axial direction into its mounted position. In principle, an insertion or removal of the functional part into or from the filter element in radial direction is possible also.

The functional part is advantageously exchangeably secured on the terminal discs. The connection can be realized mechanically, for example, by a clip-on action.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
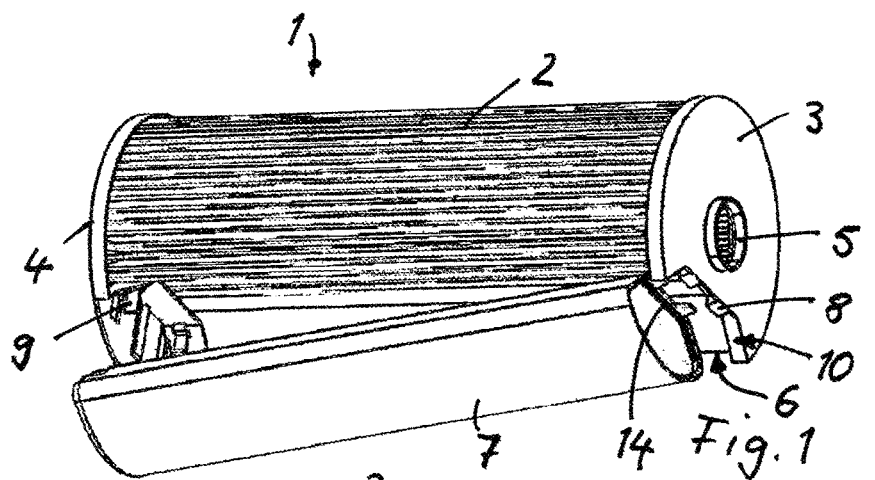
FIG. 1 shows in a perspective view a filter device for oil filtration, comprising an annular filter element that is arranged between terminal discs and comprises a segment-shaped recess into which a cartridge as functional part is inserted, the cartridge shown in partially removed state.
Figure 2:
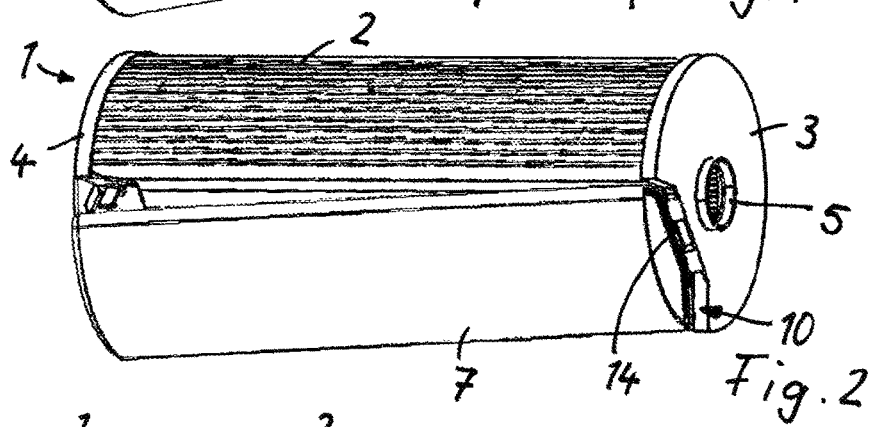
FIG. 2 shows the filter device according to FIG. 1, with the cartridge shown shortly before reaching the mounted position.
Figure 3:
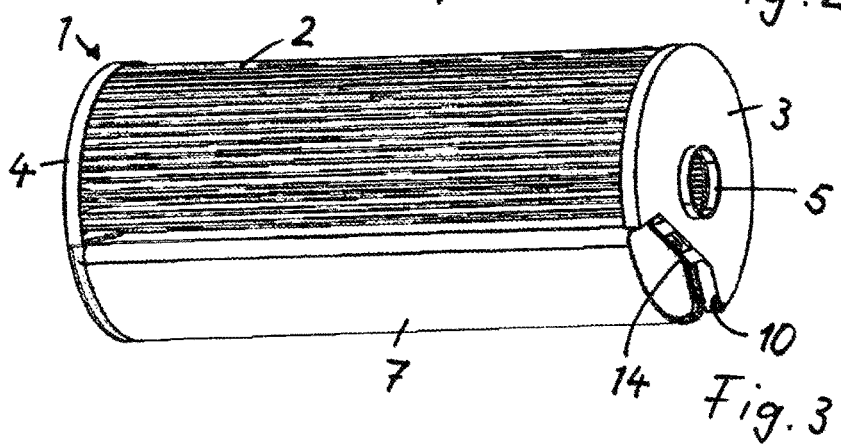
FIG. 3 shows the filter device according to FIGS. 1 and 2, with the cartridge in the inserted state.

In FIGS. 1 to 3, a filter device 1 for oil filtration is illustrated. The filter device 1 comprises an annular filter element 2 that is configured as a folded filter element and comprises, distributed about the circumference, a plurality of individual paper folds. The annular filter element 2 is flowed through radially from the exterior to the interior, wherein an inwardly positioned cavity forms the clean side by means of which the clean fluid flows out axially. The annular filter element 2 is framed at both end faces by terminal discs 3, 4, wherein an outflow opening 5 is introduced into the terminal disc 3 by means of which the purified fluid is axially discharged from the inwardly positioned cavity 12 of the annular filter element 2.

The terminal discs 3, 4 are connected fixedly with the end-face edges of the folds of the annular filter element 2. The cavity 12 in the annular filter element 2 is lined and supported by a support tube or central tube 11.

Into the filter element 2, a segment-shaped or sector-shaped recess 6 is introduced into which a functional part 7 as a separate component can be inserted and, in the embodiment, is configured as a cartridge for receiving an additive. By means of the additive, the oil to be purified can be regenerated. As the fluid (oil) flows into the filter device, a partial stream of the oil to be purified comes into contact with the additive through openings in the cartridge 7 or the additive can exit from these openings and mix with the oil.

The recess 6 is matched to the shape of the cartridge 7 so that in the inserted state (FIG. 3) the cartridge 7 completely fills the recess 6. The cartridge 7 has the same axial length as the filter element 2 and has a sector-shaped or segment-shaped cross-sectional shape. In the inserted state, the cartridge 7 fills completely the recess 6 and the radial outwardly positioned wall of the cartridge 7 is a continuation of the wall surface of the filter element 2; in the mounted state, the cartridge 7 and the filter element 2 thus have the same outer radius.

The cartridge 7 is detachably secured on the filter device, in particular connectable mechanically to the terminal discs 3 and 4, for example, by being clipped on. The terminal discs 3, 4 have form-fit elements 8, 9 which are to be engaged by the corresponding form-fit elements provided on the cartridge 7.

The terminal disc 4 is circular so that in the inserted state the facing end face of the cartridge 7 is resting on the inner surface of the terminal disc 4. In contrast thereto, the oppositely positioned terminal disc 3 has a cutout 10 which corresponds to the cross-section of the cartridge 7. This makes it possible to install the cartridge 7 optionally also in axial direction. In the mounted state, the cartridge 7, as illustrated in FIG. 3, can extend up to the terminal disc 3 but can end in front of the terminal disc 3. Possible are also embodiments in which the cartridge 7 is axially slightly longer and fills out the cutout 10 in the terminal disc 3 so that the end face of the cartridge 7 coincides with the outwardly positioned end face of the terminal disc 3.

Figure 4:
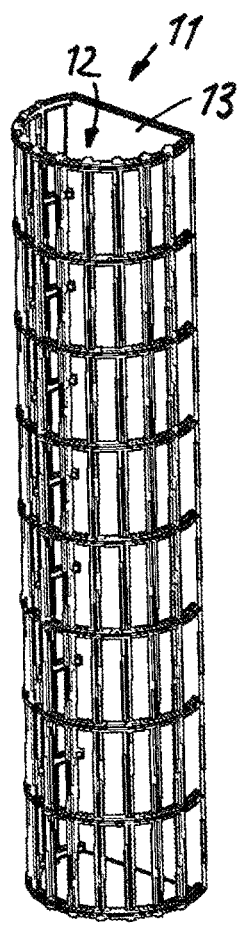
FIG. 4 shows in perspective individual illustration the central tube that is to be mounted within the filter element, comprising a flat closed wall.
Figure 5:
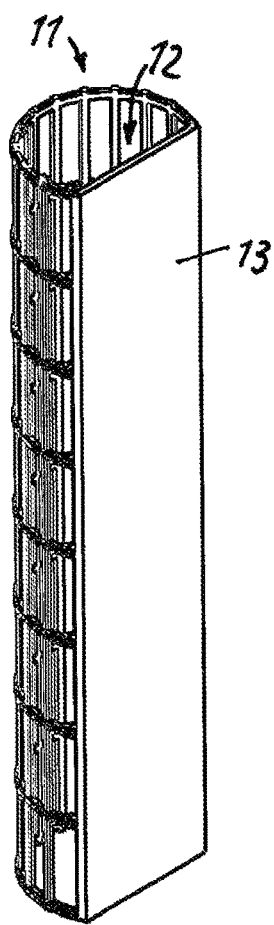
FIG. 5 shows the central tube according to FIG. 4 in another perspective.

FIGS. 4 and 5 show a central tube 11 which is integrated into the annular filter element 2 and delimits the inwardly positioned cavity 12. The central tube 11 forms a support for stabilization of the annular filter element 2. The central tube 11 that is comprised advantageously of plastic material is provided in its wall with a plurality of flow openings through which the fluid to be purified can pass radially from the exterior into the inwardly positioned cavity 12 from where the fluid subsequently is discharged in axial direction.

A wall 13 of the central tube 11 is flat and continuous or closed, i.e., without flow openings. This wall 13 is located in the mounted state in the area of the recess 6 that is introduced into the annular filter element 2 (FIG. 1). By means of the flat wall 13, a sector is cut out of the hollow cylindrical central tube 11.

The cartridge 7 has a wall 14 which is also flat and which, in the mounted state, is positioned as a radial inwardly positioned wall 14 immediately neighboring the facing wall 13 of the central tube 11. The facing wall 13 and the radial inwardly positioned wall 14 are positioned parallel and at a minimal spacing relative to each other. This makes it possible to place the filter medium of the filter element 2 across the exterior side of the wall 13 of the central tube 11 so that a continuous filter element 2 is provided in circumferential direction.

Figure 6:
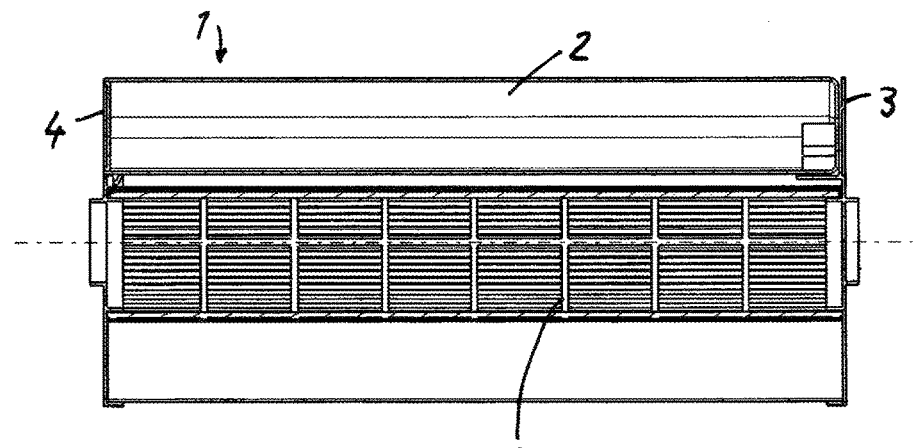
FIG. 6 shows a filter device with an annular filter element and a central tube in a further embodiment variant, illustrated in longitudinal section.
Figure 7:
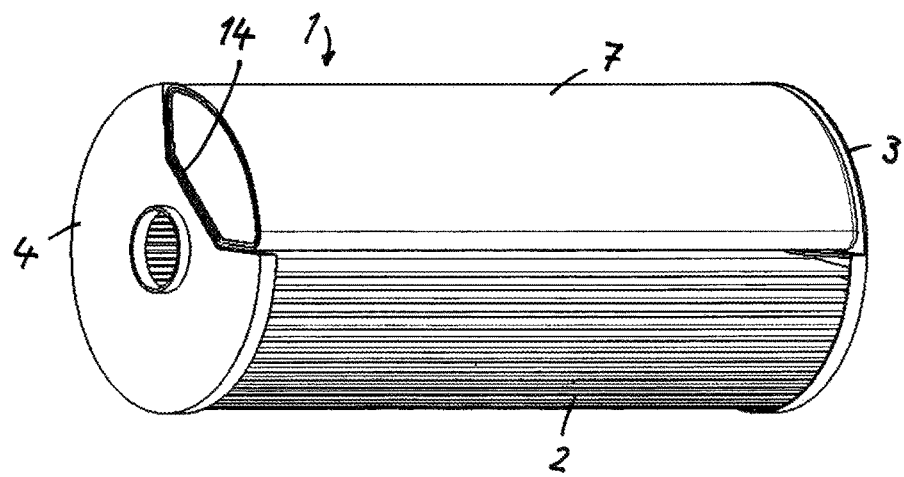
FIG. 7 shows the filter device according to FIG. 6 with inserted cartridge.

In FIGS. 6 and 7, a further embodiment of a filter device 1 for oil filtration is illustrated. The filter device 1 has basically the same configuration as in the first embodiment so that in regard to same components reference is being had to the above description.

However, in contrast to the first embodiment, the central tube 11 is provided on the side facing the functional part 7 with a flat wall with flow openings according to FIGS. 6 and 7. In the mounted state, the radial inwardly positioned wall 14 of the functional part 7 that is also of a flat configuration can thus be positioned at a minimal spacing relative to the flat facing wall 13 of the central tube 11 so that a gap is formed by means of which optionally fluid to be purified can pass into the inwardly positioned cavity 12 of the annular filter element 2.

While specific embodiments of the invention have been shown and described in detail to illustrate the inventive principles, it will be understood that the invention may be embodied otherwise without departing from such principles.

What is claimed is:

1. A filter device comprising:
    an annular filter element;
    a central tube inserted into the annular filter element and delimiting an inwardly positioned cavity of the annular filter element;
    a functional part inserted into the annular filter element and extending parallel to a longitudinal axis of the annular filter element, wherein the functional part is arranged in radial direction of the annular filter element outward of the central tube;
    wherein the functional part comprises a radial inwardly positioned wall facing the central tube;
    wherein the central tube comprises a facing wall that is facing the radial inwardly positioned wall of the functional part;
    wherein the radial inwardly positioned wall of the functional part is positioned parallel to or concentric to the facing wall of the central tube.

2. The filter device according to claim 1, wherein the functional part is configured as a circular segment and comprises a radial outwardly positioned wall, wherein the radial outwardly positioned wall has an outer radius and wherein the annular filter element has an outer radius, wherein the outer radius of the radial outwardly positioned wall and the outer radius of the annular filter element are at least approximately identical.

3. The filter device according to claim 1, wherein the functional part is a cartridge configured to receive a functional medium.

4. The filter device according to claim 1, wherein the facing wall of the central tube is flat.

5. The filter device according to claim 1, wherein the facing wall of the central tube is closed.

6. The filter device according to claim 1, wherein the radial inwardly positioned wall of the functional part is positioned at a spacing relative to the facing wall of the central tube so that a gap is defined.

7. The filter device according to claim 6, wherein the annular filter element is extended through the gap provided between the radial inwardly positioned wall of the functional part and the facing wall of the central tube.

8. The filter device according to claim 1, further comprising terminal discs connected to opposed end faces of the annular filter element.

9. The filter device according to claim 8, wherein the functional part has an end face that is delimited by one of the terminal discs.

10. The filter device according to claim 8, wherein one of the terminal discs is provided with a cutout that has a shape corresponding to a cross-sectional shape of the functional part.

11. The filter device according to claim 8, wherein the functional part is secured exchangeably on the terminal discs.

* * * * *